(12) United States Patent
Oshio et al.

(10) Patent No.: US 7,815,250 B2
(45) Date of Patent: Oct. 19, 2010

(54) UNDERCOVER FOR VEHICLE AND MOUNTING STRUCTURE THEREOF

(75) Inventors: Kiyotaka Oshio, Hitachiomiya (JP); Atsuyoshi Kawai, Utsunomiya (JP); Yoichi Maeda, Shioya-gun (JP); Yohtaroh Ukai, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/251,682

(22) Filed: Oct. 15, 2008

(65) Prior Publication Data
US 2009/0102220 A1    Apr. 23, 2009

(30) Foreign Application Priority Data
Oct. 19, 2007    (JP) .............................. 2007-272605

(51) Int. Cl.
*B60K 37/00* (2006.01)
(52) U.S. Cl. ...................... 296/204; 293/113
(58) Field of Classification Search ................ 296/204; 181/272, 269, 227, 252, 247, 228; 180/296, 180/89.2, 309; 293/113
See application file for complete search history.

(56) References Cited

U.S. PATENT DOCUMENTS

| | | | | |
|---|---|---|---|---|
| 2,568,409 A * | 9/1951 | Phillips | ...................... | 293/113 |
| 2,658,580 A * | 11/1953 | Trembley | .................... | 293/113 |
| 2,841,232 A * | 7/1958 | Loeffler | ..................... | 296/37.2 |
| 2,854,278 A * | 9/1958 | Zerhan, Jr. | ................... | 293/113 |
| 2,902,102 A * | 9/1959 | Gorman et al. | ............. | 293/113 |
| 2,965,404 A * | 12/1960 | Pittsley et al. | ................ | 293/113 |
| 2,979,357 A * | 4/1961 | Leach et al. | ................. | 293/113 |
| 2,992,035 A * | 7/1961 | Tell et al. | ..................... | 293/113 |
| 4,786,265 A * | 11/1988 | Porter | ...................... | 440/89 R |
| 4,936,412 A * | 6/1990 | Sala | ........................... | 181/282 |
| 5,321,214 A * | 6/1994 | Uegane et al. | .............. | 181/211 |
| 5,726,398 A * | 3/1998 | Zahn et al. | ................... | 293/117 |
| 6,024,617 A * | 2/2000 | Smullin et al. | ............ | 440/89 R |
| 6,173,800 B1 * | 1/2001 | Steenackers et al. | ........ | 180/89.2 |
| 6,185,934 B1 * | 2/2001 | Teboul | ...................... | 60/297 |
| 6,260,652 B1 * | 7/2001 | Steenackers et al. | ......... | 180/296 |
| 6,273,772 B1 * | 8/2001 | Smullin | ..................... | 440/89 R |
| 6,536,548 B2 * | 3/2003 | Steenackers et al. | ....... | 180/89.2 |
| 6,591,939 B2 * | 7/2003 | Smullin et al. | .............. | 181/260 |
| 6,640,927 B1 * | 11/2003 | Turner | ........................ | 181/252 |
| 7,419,028 B2 * | 9/2008 | Yamakura et al. | ........... | 180/291 |
| 7,458,440 B2 * | 12/2008 | Uegane | ....................... | 181/228 |

FOREIGN PATENT DOCUMENTS

| | | |
|---|---|---|
| JP | 06-137145 | 5/1994 |
| JP | 07-081440 | 3/1995 |
| JP | 07-215073 | 8/1995 |
| JP | 11-301288 | 11/1999 |
| JP | 2003-291657 | 10/2003 |

(Continued)

*Primary Examiner*—Kiran B. Patel
(74) *Attorney, Agent, or Firm*—Rankin, Hill & Clark LLP

(57) ABSTRACT

An undercover for a vehicle, which covers a silencer which is disposed on a lower surface of a body of the vehicle for discharging reacted gas of a fuel-cell mounted in the vehicle, wherein an opening is formed so as to correspond in position to an open portion which is formed at an end of a discharge pipe of the silencer.

7 Claims, 7 Drawing Sheets

FOREIGN PATENT DOCUMENTS

| | | |
|---|---|---|
| JP | 2004-175185 | 6/2004 |
| JP | 2005-280377 | 10/2005 |
| JP | 2005-291121 | 10/2005 |
| JP | 2006-002699 | 1/2006 |
| JP | 2007-001419 | 1/2007 |
| JP | 2007-106306 | 4/2007 |
| JP | 2007-224796 | 9/2007 |
| WO | 2007/096553 | 8/2007 |

* cited by examiner

UNDERCOVER FOR VEHICLE AND MOUNTING STRUCTURE THEREOF

BACKGROUND OF THE INVENTION

Priority is claimed on Japanese Patent Application No. 2007-272605, filed Oct. 19, 2007, the contents of which are incorporated herein by reference.

FIELD OF THE INVENTION

The invention relates to an undercover for a vehicle and mounting structure thereof, and more particularly, to an undercover for a fuel-cell vehicle.

DESCRIPTION OF RELATED ART

An undercover for a vehicle is mounted on the lower surface of a vehicle body in order to reduce air resistance of traveling wind flowing on the lower surface of the vehicle body and suppress noise in a vehicle cabin when the vehicle travels (for example, Japanese Unexamined Patent Application, First Publication No. 2007-1419).

Meanwhile, a fuel-cell vehicle generates electrical energy by the reaction between hydrogen and oxygen, and uses the electrical energy as a driving source. However, a large amount of oxygen is supplied to facilitate the reaction. For this reason, the flow speed of exhaust gas, which is reacted gas containing reacted oxygen and moisture, is high, therefore, noise is caused. Accordingly, a silencer should be provided.

However, since the silencer is exposed to the outside of the vehicle cabin, the silencer is cooled by environmental wind or airflow during travel. Therefore, if outside air temperature is low, there is a concern that the silence will freeze and an exhaust pipe in the silencer will clog. For this reason, there is a demand for a technique that prevents the silencer from being cooled by effectively using an undercover disposed on the lower side of the vehicle body.

Therefore, the present invention has an object to provide an undercover for a vehicle capable of preventing a silencer, which is used in a fuel-cell vehicle, from being cooled by outside air, environmental wind, and traveling wind.

SUMMARY OF THE INVENTION

In order to solve the above-mentioned problem and achieve the above-mentioned object, an undercover for a vehicle according to the present invention, which covers a silencer which is disposed on a lower surface of a body of the vehicle for discharging reacted gas of a fuel-cell mounted in the vehicle, has an opening is formed so as to correspond in position to an open portion which is formed at an end of a discharge pipe of the silencer.

According to the above-described undercover, since the silencer is covered with the undercover, it is possible to prevent the silencer from being exposed to outside air, environmental wind, and traveling wind.

Therefore, it is possible to prevent the silencer from being cooled and to prevent an discharge pipe of the silencer from being frozen when the outside air temperature is low.

It may be arranged such that a stepped portion is formed on the periphery of the opening, the stepped portion being recessed from the principal surface of the undercover for a vehicle.

In this case, even though the silencer vibrates, the end of the discharge pipe of the silencer protrudes outward from the opening due to the stepped portion formed on the periphery of the opening. Therefore, exhaust gas hardly flows backward into the undercover from the gap between the end of the discharge pipe of the silencer and the opening, and outside air hardly flows into the undercover.

It may be arranged such that a seal member is provided in a gap between the periphery of the opening and the end of the discharge pipe of the silencer so as to caulk the gap.

In this case, the gap between the periphery of the opening and the end of the discharge pipe of the silencer is sealed by the seal member that is provided between the periphery of the opening and the end of the discharge pipe of the silencer. Therefore, even though the silencer vibrates, exhaust gas does not flow backward into the undercover from the gap between the end of the discharge pipe of the silencer and the opening and is not accumulated in the cover body, and outside air does not flow into the undercover. Therefore, it is possible to prevent the exhaust pipe of the silencer from being frozen due to the outside air.

Further, in a mounting structure of an undercover for a vehicle of the present invention, the undercover and the silencer may be connected to each other.

According to the above-described mounting structure of the undercover, it is possible to prevent the undercover from being vibrated. Therefore, it is possible to improve sound vibration performance.

DETAILED DESCRIPTION OF THE INVENTION

Figure 1:
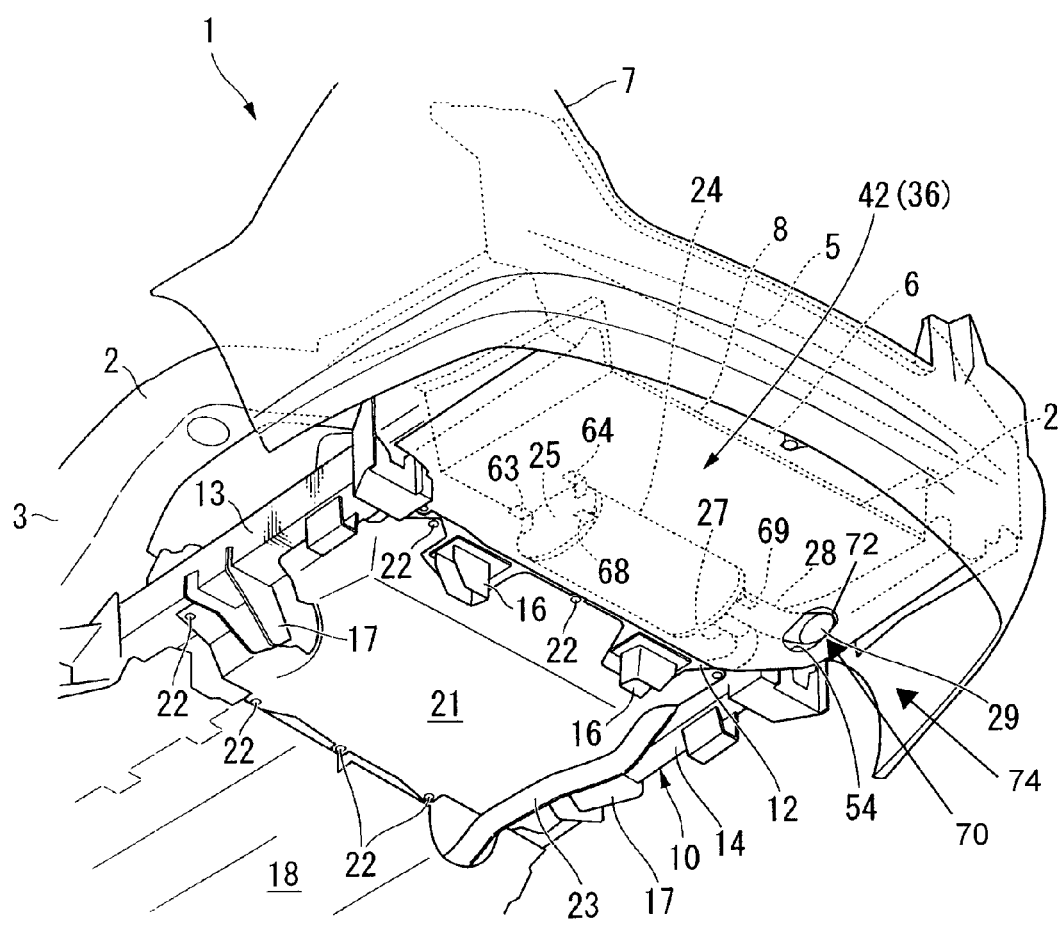
FIG. 1 is a perspective view of principal portions according to an embodiment of the present invention as seen from a left rear lower side.
Figure 2:
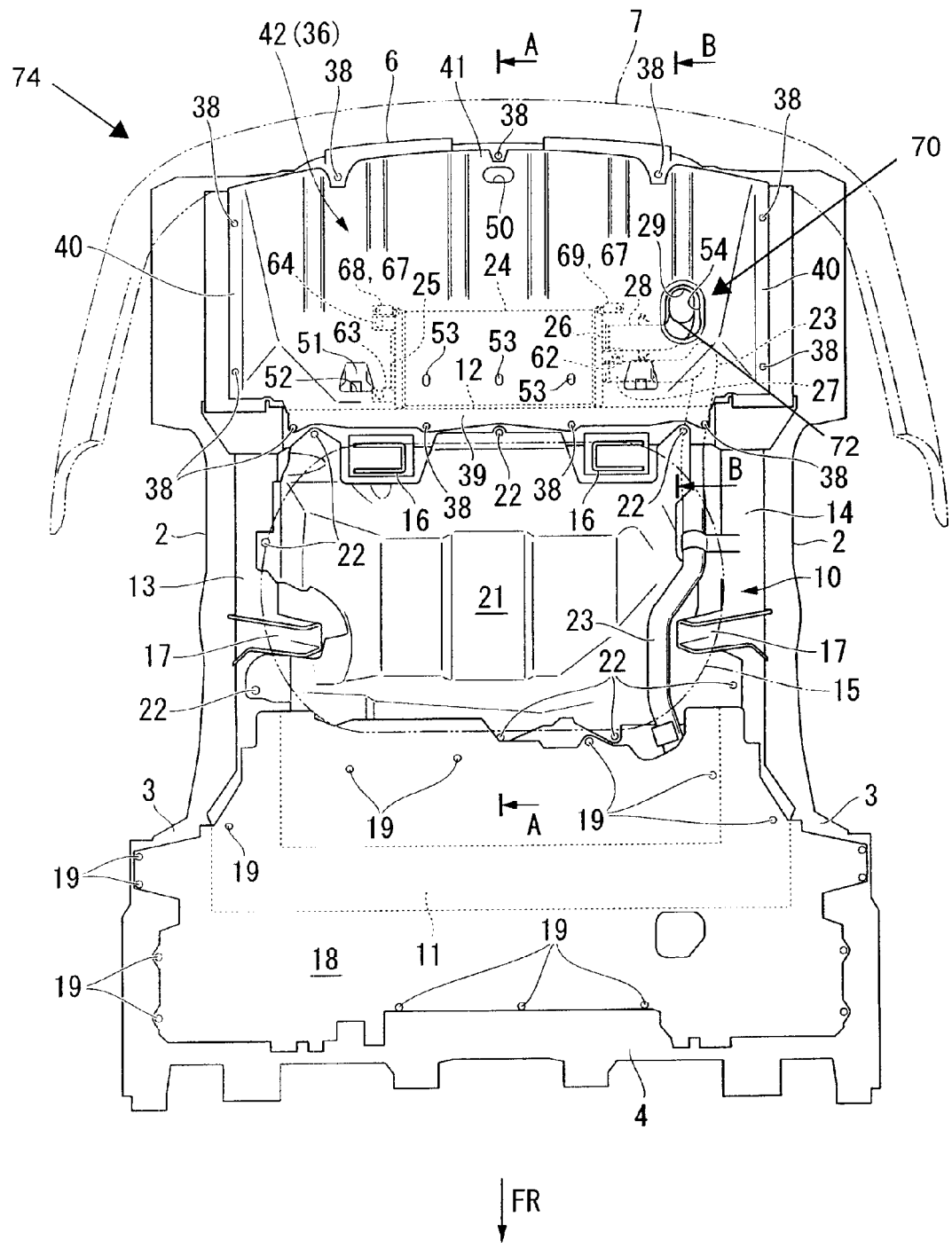
FIG. 2 is a bottom view of the embodiment according to the present invention.
Figure 3:
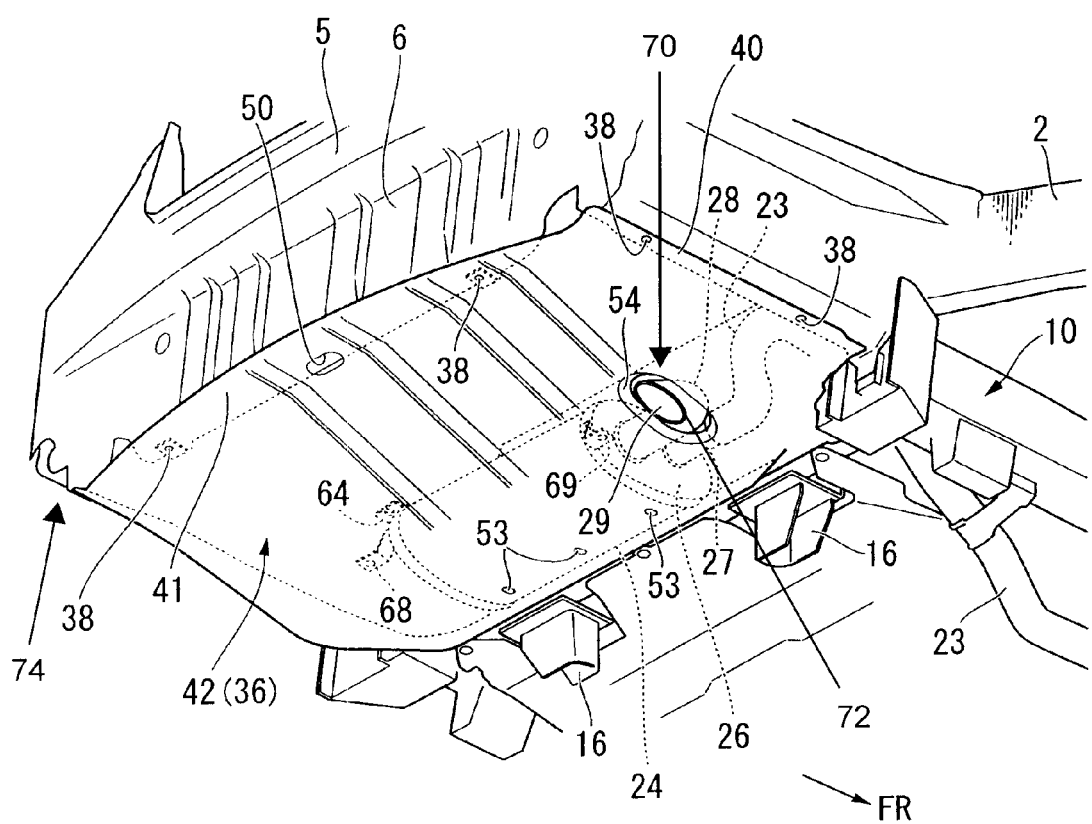
FIG. 3 is an expanded perspective view of principal portions according to the embodiment of the invention as seen from a right rear lower side.

An embodiment of the invention will be described below with reference to drawings. Meanwhile, reference character FR in the drawings indicates the front side of a vehicle body 1. As shown in FIGS. 1 to 3, rear frames 2 and 2, which extend in a longitudinal direction along a lower surface 74 of the vehicle body 1, are provided on left and right portions of the vehicle body 1 of a fuel-cell vehicle. The rear ends of the rear frames 2 and 2 are formed to be inclined upward through stepped portions 3 and 3. A middle cross member 4 (see FIG. 4) is provided between the stepped portions 3 and 3 of the left and right rear frames 2 and 2, and the rear ends of the left and right rear frames 2 and 2 are connected to each other by a rear cross member 5. A rear bumper face 7 is mounted on a rear panel 6, which forms a rear wall of the vehicle body 1 extending downward from the rear cross member 5, so as to cover the rear panel. A rear floor panel 8 is mounted on the left and right rear frames 2 and 2.

A frame-shaped sub-frame 10 is mounted from below on the rear frames 2 and 2 at a position, which is slightly closer to the front portion thereof than the rear end thereof. The sub-frame 10 includes front and rear transverse frames 11 and 12 that are provided in a vehicle width direction and left and right longitudinal frames 13 and 14 that connect left and right ends of the front and rear transverse frames 11 and 12 in the longitudinal direction of the vehicle body, and is formed in a frame shape. A battery and high-voltage electric equipment (not shown) are supported at the front portion of the sub-frame 10, and a hydrogen tank 15 is supported at the rear portion of the sub-frame.

A suspension unit (not shown) and rear wheels are supported by the sub-frame 10. Accordingly, mounting parts 16 and 16 of the suspension unit are provided on the lower surface of the rear transverse frame 12 of the sub-frame 10. Further, mounting parts 17 and 17 of the suspension unit are provided on the lower surfaces of the left and right longitudinal frames 13 and 14 of the sub-frame 10.

An electrical component undercover 18 is fixed to the lower surfaces of the stepped portions 3 and 3 of the rear frames 2 and 2 and the front transverse frame 11 of the sub-frame 10, by a plurality of bolts 19. A hydrogen tank undercover 21 is mounted to the lower portion of the hydrogen tank 15 of the sub-frame 10 by a plurality of bolts 22.

In this case, an exhaust tube 23 is provided near the right portion of the vehicle body 1. The exhaust tube 23 is provided above the electrical component undercover 18 from the front side of the vehicle body, passes by the lower portion of the hydrogen tank undercover 21, and passes by the upper portion of the rear transverse frame 12 of the sub-frame 10 along the inner portion of the right longitudinal frame 14 of the sub-frame 10.

In this case, exhaust gas, which is a reacted gas of oxygen and hydrogen having been used in a reaction, joins in a fuel cell, and then flows into the exhaust tube 23 while being diluted in a dilution box (not shown). However, if the amount of flowing exhaust gas is large, exhaust noise is considerable. For this reason, a silencer 24 is connected to the end of the exhaust tube 23 in order to reduce the exhaust noise. The silencer 24 is disposed close to the rear transverse frame 12 of the sub-frame 10 among the rear transverse frame 12 of the sub-frame 10, the left and right rear frames 2 and 2, and the rear cross member 5.

The silencer 24 is a cylindrical member that includes elliptical left and right end plates 25 and 26 at both ends thereof in a vehicle width direction. A short pipe 27 is fixed to a front portion of the right end plate 26 so as to be parallel to the vehicle width direction. The exhaust tube 23 is fixed to the short pipe 27 from the right side of the vehicle body toward the middle portion in the vehicle width direction. The short pipe 27 and a tail pipe 28, which communicates with an expansion chamber (not shown) provided inside, are connected to a rear portion of the right end plate 26 toward the outer side in the vehicle width direction. The end 72 of the tail pipe 28 is bent toward the rear side and then bent toward the lower side so as to face an opening portion 29.

Figure 4:
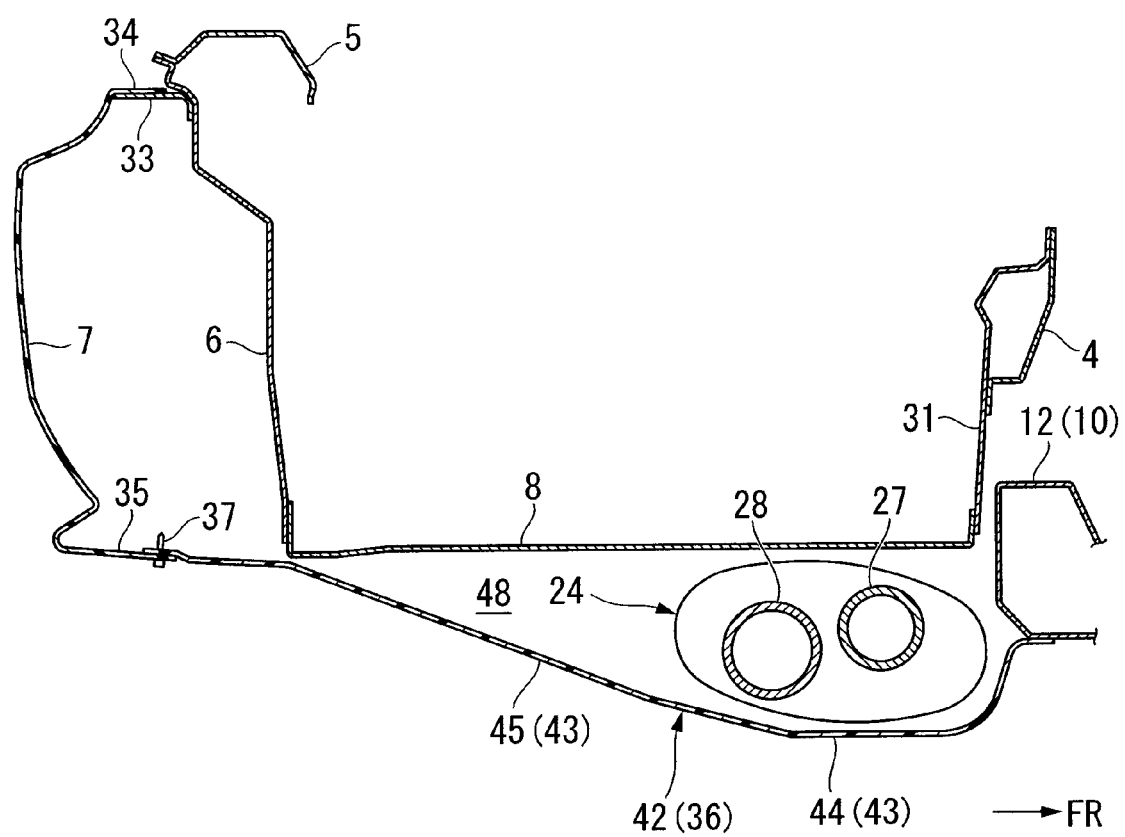
FIG. 4 is a cross-sectional view taken along a line A-A of FIG. 2.

FIG. 4 is a cross-sectional view taken along a line A-A of FIG. 2. A lower edge portion 31 is formed on the middle cross member 30 that connects the stepped portions 3 and 3 of the above-mentioned left and right rear frames 2 and 2. The lower edge portion 31 extends near the rear surface of the rear transverse frame 12 of the sub-frame 10, and the rear panel 6 forming the lower edge portion of the rear cross member 5 also extends downward to the same position as the lower edge portion 31 of the middle cross member 30. Further, a rear floor panel 8 is bonded to the lower edges of the lower edge portion 31 and the rear panel 6. The silencer 24 is disposed below the rear floor panel 8.

In this case, an upper edge 34 of the rear bumper face 7 is mounted to the rear cross member 5 by a bracket 33. A lower edge portion 35 of the rear bumper face 7 extends to the vicinity of the bottom wall position of the rear floor panel 8. An undercover 36 is mounted between the lower edge portion 35 of the rear bumper face 7 and the lower surface of the rear transverse frame 12 of the sub-frame 10. Meanwhile, the undercover 36 and the rear bumper face 7 are mounted by a clip 37.

As shown in FIG. 2, the undercover 36 is made of a resin material such as a PP material because the exhaust gas temperature is low (normally about 60 deg C.). A front edge portion 39 of the undercover 36 is mounted on the rear transverse frame 12 of the sub-frame 10 at four positions by bolts 38. A side edge portion 40 of the undercover 36 is fixed to the front and rear portions of the rear frame 2 by bolts 38. A rear edge portion 41 of the undercover 36 is mounted on the rear panel 6 at three positions through the rear bumper face 7 by bolts 38.

Figure 5:
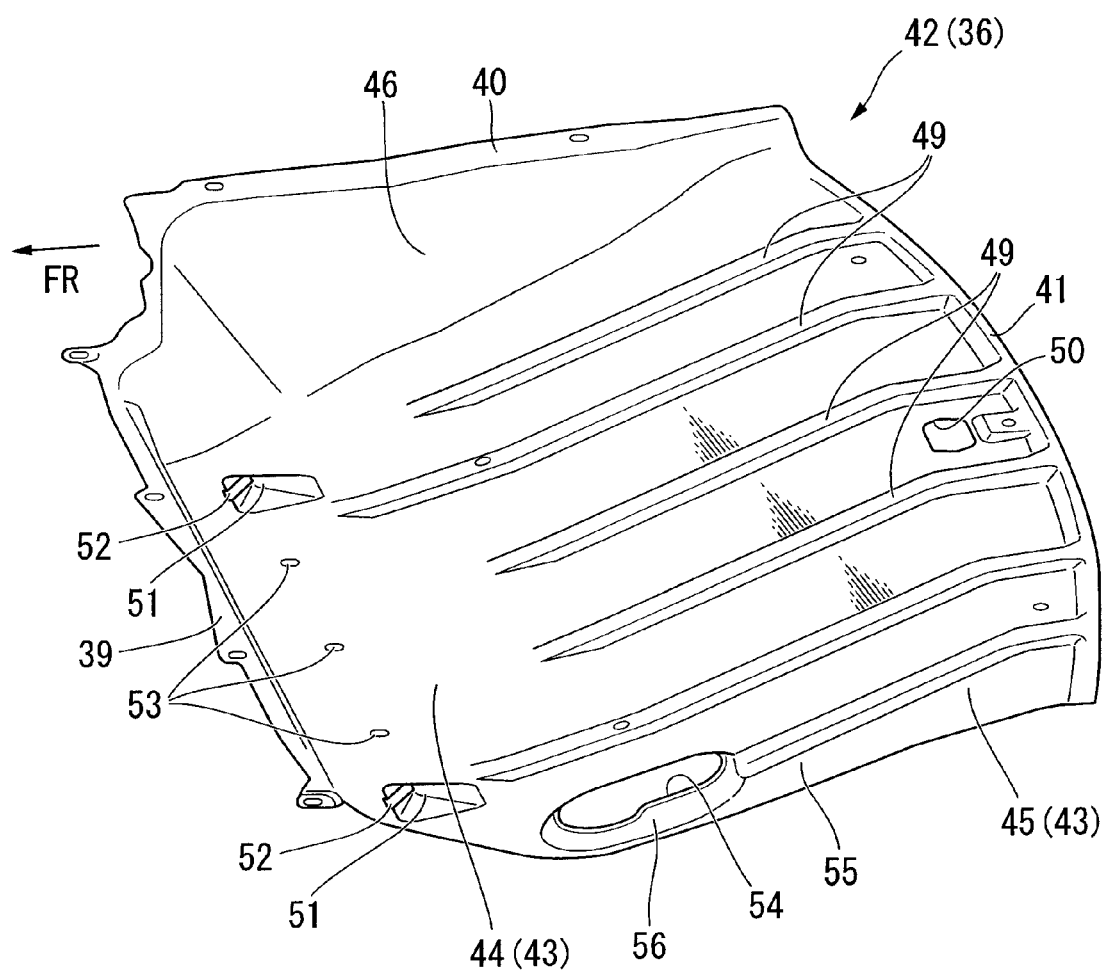
FIG. 5 is a perspective view of an undercover.

As shown in FIGS. 4 and 5, a lower wall 43 of a cover body 42 of the undercover 36 is formed of a flat portion 44 below the silencer 24. A rear portion of the flat portion is formed of an inclined portion 45 that is inclined upward and rearward. A side wall 46 is formed so as to approach a bottom wall 47 of the rear floor panel 8 toward the rear side, and is formed so that the height thereof is decreased. Accordingly, the silencer 24 is positioned in a space 48 formed between the undercover 36 and the rear floor panel 8.

A plurality of reinforcing and flow-straightening ribs 49 is formed on the outer surface of the bottom wall 47 of the cover body 42 of the undercover 36 in the longitudinal direction of the vehicle body. A tow anchor hole 50 is formed at the middle portion of the front portion of the bottom wall 47 in the vehicle width direction. Recesses 51 and 51 are formed on both side portions of the outer surfaces of the bottom wall 47 of the cover body 42 not to be closed by snow, and a drain hole 52 is formed at the bottom wall of each recess 51. Three drain holes 53, 53, and 53 through which drainage is normally performed are formed between the drain holes 52 and 52.

An opening 54 to which the end 72 of the tail pipe 28 of the silencer 24 corresponds is formed at the inclined portion 45 of the cover body 42. A stepped portion 56, which is formed to be recessed from a principal surface 55 of the cover body 42, is formed on the periphery of the opening 54.

Figure 6:
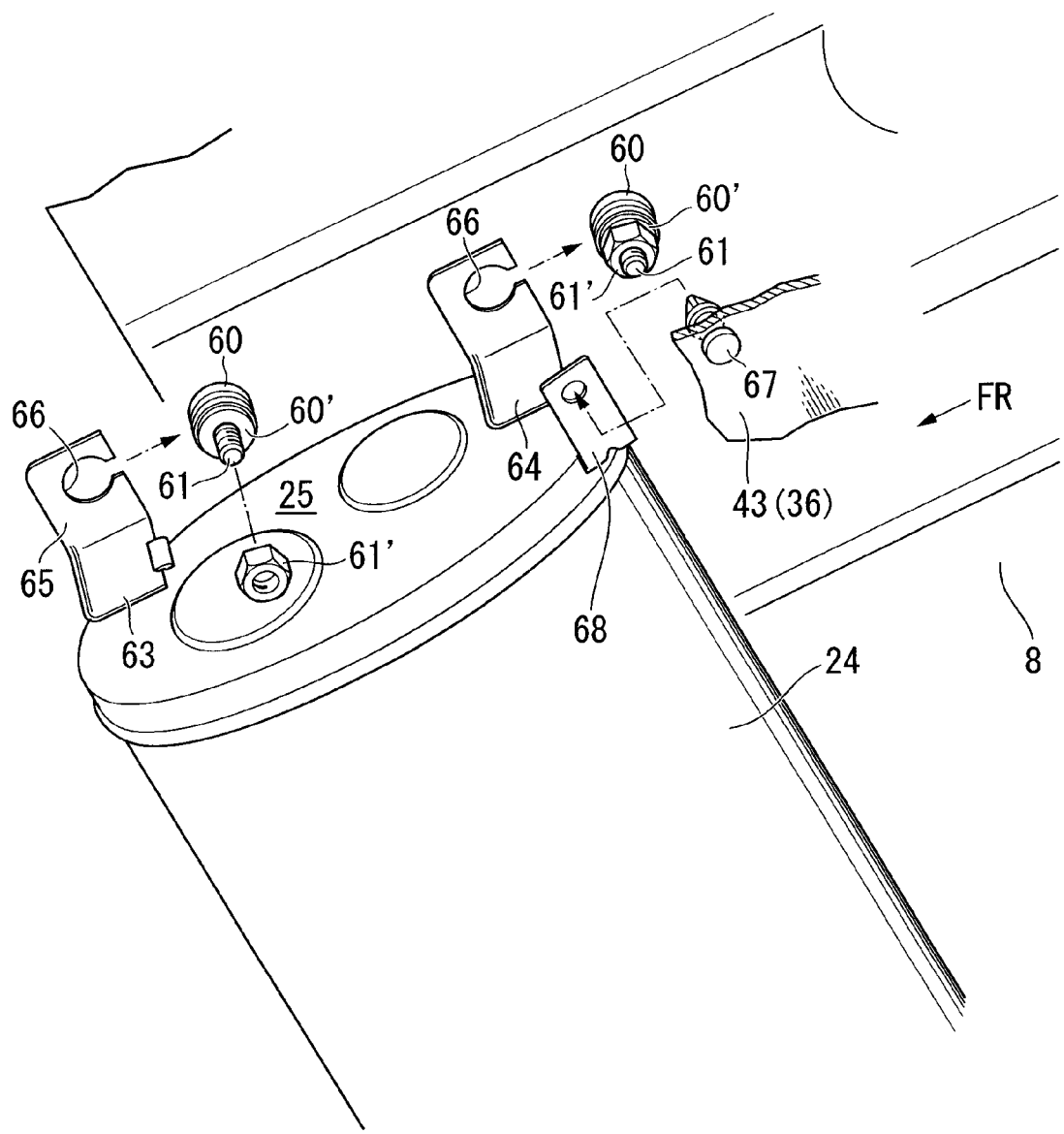
FIG. 6 is a perspective view of a silencer that is mounted.

As shown in FIGS. 2 and 6, a right support bracket 62, which is fixed to the rear floor panel 8 through a rubber bush 60 and a collar 60' by a bolt 61 and a nut 61', is provided between the short pipe 27 and the tail pipe 28 above the right end plate 26 of the silencer 24. A left front support bracket 63 and a left rear support bracket 64, which are fixed to the rear floor panel 8 through a rubber bush 60 and a collar 60' by a bolt 61 and a nut 61', are provided at the left end plate 25 of the silencer 24.

Each of the right support bracket 62, the left front support bracket 63, and the left rear support bracket 64 is an L-shaped member, and a cutout part 66 of which the rear portion is opened is formed at the mounting part 65 that is mounted to the rear floor panel 8 (not shown at the right support bracket 62). The bolt 61, the collar 60', and the rubber bush 60 are inserted into the cutout part 66 and are tightened by the nut 61', and the silencer 24 is supported so as to float.

A left clip bracket 68, which is fixed to the undercover 36 by a clip 67, is provided at the front lower portion of the left end plate 25. A right clip bracket 69, which is fixed to the undercover 36 by a clip 67, is provided at the front lower portion of the right end plate 26.

Figure 7:
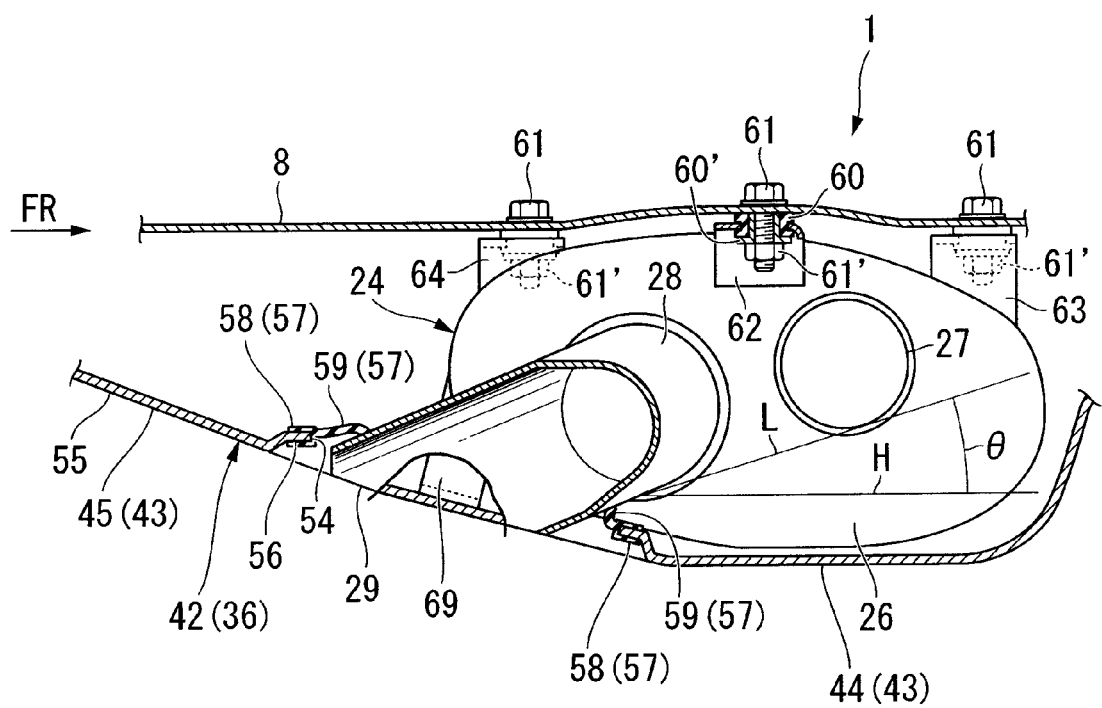
FIG. 7 is a cross-sectional view taken along a line B-B of FIG. 2.

As shown in FIG. 7, the tail pipe 28, which is mounted to the right end plate 26 of the silencer 24, is connected to the right end plate on the rear side of the short pipe 27 at a position slightly lower than the short pipe. Specifically, a straight line L, which connects a bottom portion of the short pipe 27 to a bottom portion of the tail pipe 28, is inclined with respect to a horizontal line H by an angle θ (17°).

Accordingly, as long as the vehicle body 1 is not inclined forward by an angle larger than 17°, the opening portion 29 formed at the end of the tail pipe 28 is positioned below the short pipe 27. Therefore, it is possible to drain produced water, which exists in exhaust gas in the form of water vapor or water. Meanwhile, if the vehicle body 1 is inclined backward, the tail pipe 28 is positioned below the short pipe 27. Therefore, there is no problem with drainage.

In this case, a seal member 57, which comes in close contact with the outer peripheral surface of the tail pipe 28 of the silencer 24, is mounted on the periphery of the opening 54 of the cover body 42 of the undercover 36.

The seal member 57 includes a mounting part 58 that has a U-shaped cross-section and is fitted to the periphery of the tail pipe 28, and a lip part 59 that comes in close contact with the outer periphery of the tail pipe 28.

The lip part 59 is formed to extend slightly closer to the right end plate 26 than the opening portion 29 formed at the end 72 of the tail pipe 28. The lip part 59 has a sufficient length and deflection margin so that the lip part 59 is not separated from the outer periphery of the tail pipe 28 even though the silencer 24, that is, the tail pipe 28 vibrates.

In this case, the opening portion 29 formed at the end 72 of the tail pipe 28 is formed so as to be flush with the principal surface 55 of the cover body 42 of the undercover 36. When the seal member 57 is mounted, the mounting part 58 of the seal member 57 does not protrude outward from the principal surface 55 of the cover body 42 of the undercover 36. The undercover 36 includes the cover body 42 and the seal member 57. Meanwhile, for convenience, the seal member 57 is shown only in FIG. 7 and omitted in FIGS. 1 to 3.

According to the above described embodiment, the silencer 24 is covered with the undercover 36, and is received in the space 48 that is surrounded by the rear floor panel 8 and the undercover 36. Accordingly, it is possible to prevent the silencer 24 from coming in direct contact with outside air, and to prevent the silencer 24 from being cooled by outside air, environmental wind, traveling wind.

Therefore, it is possible to reliably prevent the inner portion of the silencer 24 from being cooled. As a result, according to the characteristics of the fuel-cell vehicle, low-temperature exhaust gas is not directly cooled by the outside air, the environmental wind, and the traveling wind, and it is possible to prevent the inside exhaust pipe from being frozen.

The opening portion 29 formed at the end 72 of the tail pipe 28 of the silencer 24 is set to be flush with the principal surface 55 of the undercover 36, and the opening 54 of the cover body 42 of the undercover 36 is set to a position below the principal surface 55 by the stepped portion 56. For this reason, the opening portion 29 can display a flow-straightening effect of the undercover 36 with the rib 49 of the cover body 42.

The seal member 57, which comes in close contact with the outer peripheral surface of the tail pipe 28 of the silencer 24, is mounted on the periphery of the opening 54 of the cover body 42 of the undercover 36. Accordingly, even though fluctuation occurs in mounting the silencer 24, or even though the tail pipe 28 of the silencer 24 vibrating to some extent is swung, the seal member 57 can be maintained while closing a gap 70 between the opening 54 of the cover body 42 of the undercover 36 and the outer peripheral surface of the tail pipe 28 of the silencer 24. Therefore, it is possible to reliably prevent the silencer 24 from being cooled by preventing outside air from flowing into the space 48, and to prevent the exhaust gas from flowing backward and being accumulated in the space 48.

The silencer 24 is reliably supported against the rear floor panel 8 by the right support bracket 62 that is provided at the right end plate 26 and the left front support bracket 63 and the left rear support bracket 64 that face the left end plate 25 through the rubber bushes 60, so as to float. Further, the silencer is fixed to the undercover 36 by left and right clip brackets 68 and 69 with the clip 67. Therefore, it is possible to prevent the vibration of the undercover 36 and to improve sound vibration performance.

The front flat portion 44 of the lower wall 43 of the undercover 36 is inclined upward on the rear side. Accordingly, the opening portion 29 formed at the end 72 of the tail pipe 28 is seen through the opening 54, and it has a good appearance, and the exhaust gas can be smoothly discharged by traveling wind flowing along the lower wall of the undercover 36.

The invention is not limited to the above-mentioned embodiment. For example, as long as the gap 70 between the periphery of the opening 54 of the undercover 36 and the tail pipe 28 of the silencer 24 is closed, a seal member coming in close contact with the periphery of the opening 54 of the undercover 36 may be provided around the tail pipe 28. The angle θ between the straight line L, which connects the bottom portion of the short pipe 27 to the bottom portion of the tail pipe 28, and the horizontal line H is an example. When the vehicle body is inclined forward, the drainage of moisture in the tail pipe 28 only needs to be ensured.

The opening portion 29 formed at the end 72 of the tail pipe 28 of the silencer 24 protrudes outward from the opening 54 of the undercover 36 by providing the stepped portion 56 on the periphery of the opening 54 of the undercover 36. Therefore, even though the seal member 57 is not provided, if the silencer 24 vibrates, the exhaust gas hardly flows backward into the cover body 42 from the gap 70 between the opening portion 29 formed at the end of the tail pipe 28 and the opening 54 of the undercover 36, and outside air hardly flows into the cover body 42.

While preferred embodiment of the invention has been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle undercover that covers a silencer that is disposed on a lower surface of a vehicle body, said silencer for discharging reacted gas, wherein an opening is formed in the vehicle undercover so as to correspond in position to an open portion of an end of a tail pipe of the silencer, said silencer having an end plate from which said tail pipe and a short pipe extend, wherein, at said end plate, a bottom of said short pipe is disposed relative to a bottom of said tail pipe such that a straight line (L) connecting said short pipe bottom and said tail pipe bottom forms a predetermined angle (e) relative to a horizontal line (H) and thereby allows water from the reacted gas, which flows through the short pipe into the silencer, to drain from the short pipe and the silencer via the tail pipe.

2. The vehicle undercover according to claim 1, wherein a stepped portion is formed on the periphery of the opening of the vehicle undercover, the stepped portion of the opening being recessed from a principal surface of the vehicle undercover.

3. The vehicle undercover according to claim 1, wherein a seal member is provided in a gap between the periphery of the opening and the end of the tail pipe of the silencer so as to caulk the gap.

4. The vehicle undercover according to claim 1, wherein the predetermined angle is about 17°.

5. The vehicle undercover according to claim 1, wherein the undercover includes a rib that connects to the opening that aligns with the silencer tail pipe, said rib serving to stiffen the undercover at the opening and thereby prevent the opening from coming out of alignment with the tail pipe.

6. The vehicle undercover according to claim 1, wherein the silencer is secured to the undercover by a series of clips that permit the silencer to float relative to the undercover and thereby preventing transmission of vibrations from the silencer to the undercover while maintaining the silencer tail pipe in alignment with the undercover opening.

7. The vehicle undercover according to claim 1, wherein a flat portion of the undercover is disposed relatively beneath the silencer, and a vertically inclined portion of the undercover extends rearwardly from the flat portion, and wherein the opening is formed in the flat portion.

* * * * *